Jan. 26, 1937.	R. J. WISEMAN	2,068,940
ELECTRIC CABLE
Filed June 23, 1934
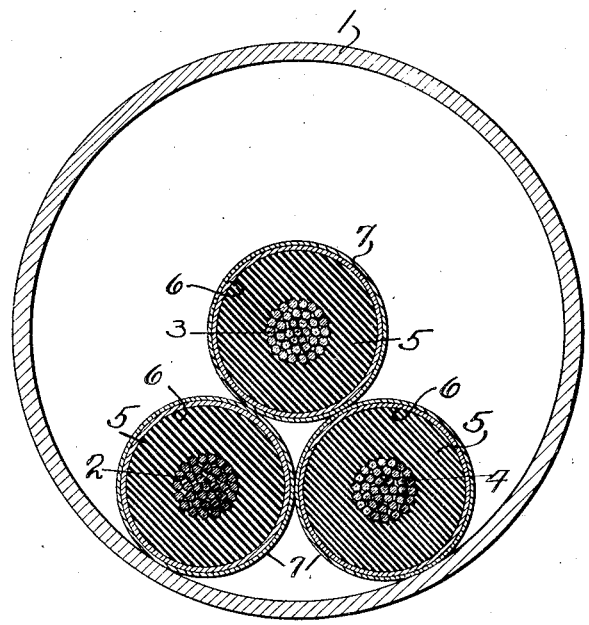
INVENTOR
Robert J. Wiseman,
BY
Kiddle, Bothell and Montgomery.
ATTORNEYS.

Patented Jan. 26, 1937

2,068,940

UNITED STATES PATENT OFFICE 2,068,940

ELECTRIC CABLE

Robert J. Wiseman, Paterson, N. J., assignor to The Okonite Company, Passaic, N. J., a corporation of New Jersey Application June 23, 1934, Serial No. 732,003

1 Claim. (Cl. 247—3)

My invention relates to an improvement in electric cables or electric cable systems and has for one of its objects the provision of an electric cable system capable of operating at high voltages so as to carry heavy electric power loads economically.

Engineers working with this end in view have developed cables or cable systems in which the conductors are insulated with paper impregnated with an insulating compound and encased in a lead sheath. Some features of this cable are not entirely satisfactory. For example, the cable heats up in operation, the insulating compound expands building up a pressure within the cable at time sufficient to rupture the sheath.

In more recent years the so-called oil filled cable has been developed. The conductors of this cable are paper insulated and encased in a lead sheath. Channels or tubes are provided either in the center of the conductor if it is a single conductor cable, or in the interstices in the case of multiple conductor cables, and kept filled with a very thin oil. This type of cable is an advance over the cables first mentioned so far as current carrying capacity is concerned but such systems are very expensive, special treatment of the oil being necessary to insure that the same will be electrically and physically stabile, in order that the life of the cable may not be shortened, and expensive apparatus such as reservoirs, joints and terminal apparatus are required to maintain the cable in operating condition yet prevent excessive pressures from taking place.

To eliminate the shortcomings mentioned above and at the same time to provide a system capable of being operated at high voltages so as to carry heavy electric power loads economically I propose in accordance with the present invention to insulate the cable conductors with a dielectric such as rubber insulation, gutta percha, rubber compounds or other similar materials and then to enclose the conductors thus insulated in a pipe of substantially greater cross section than the conductor which is maintained filled with a gaseous medium having high electrical resistance and high heat conductivity, and freedom from deleterious action on the insulation of the conductor with which it is in direct contact, this gaseous medium being maintained under superatmospheric pressure. The pipe is of such internal diameter relatively to the space occupied by the cable conductors and their insulation that the conductors may be readily drawn into the pipe and have free movement relatively to each other within the pipe.

While rubber insulated cables are old in the cable art they are not satisfactory, as commonly used, for voltages over say 6000 volts, and with higher voltages rubber insulated cables fail quickly. These failures are due to cutting of the insulation by reason of the ozone formed as the result of corona occurring on the surface of the insulation and sometimes starting at the conductor. Corona increases with increase in voltage and hence the successful use of rubber insulation up to the present has been limited to the relatively low voltages mentioned above.

I have mentioned rubber, rubber compounds, gutta percha and similar materials as a suitable insulation for my improved cable and for clarity of description these materials will be referred to hereinafter and in the appended claim as rubber compounds.

The gaseous medium employed is an inert gas or a mixture of inert gases such as a mixture of nitrogen and helium. Such a mixture has high electrical resistance and high heat conductivity, characteristics very desirable and very advantageous for my purpose. As mentioned above this gaseous medium is maintained under superatmospheric pressure which may be as high, for example, as 200 pounds to the square inch.

By maintaining the gaseous medium surrounding the insulated conductors under a superatmospheric pressure I materially increase its dielectric strength, roughly directly proportional to the number of atmospheres of pressure used. This results in an equally great increase in the voltage at which corona will occur at the surface of the insulation and thereby permits of increasing the operating voltage on the cable for the same thickness of rubber insulation. This means that rubber compounds can be used at higher voltages than normally used at present.

By employing a gas which is a good conductor of heat it will be appreciated that the heat generated by the current in the cable conductors is easily carried or conducted to the enclosing pipe where it is radiated away thereby obtaining the effect of radiation from a large surface with a very low temperature gradient between the surface of the insulation and the pipe.

In the accompanying drawing I have illustrated a cross section of a cable system embodying my invention.

Referring to the drawing in detail, I designates a metal pipe such as steel, for example, of relatively large internal diameter so as to permit of easy drawing in of the cable conductor or conductors, the cable, in the practice of my invention, comprising a single conductor or a plurality, as the case may be. For purposes of illustration I have shown three conductors designated 2, 3 and 4. Each of these conductors is independently insulated with insulation 5. As mentioned above this insulation, which I shall refer to as a rubber compound for the sake of brevity of description, may be rubber, rubber compound, gutta percha or other suitable insulating materials, impervious to the gaseous medium with which the pipe is to be filled, and whose current carrying capacity is improved by maintaining the gaseous medium under pressure.

About the insulation of each conductor I may or may not employ a shielding material, designated 6. This shielding material 6 may be the usual metal conducting tape or it may be a conducting rubber compound as, for example, a compound composed of:

(1)
| | Parts |
|---|---|
| Rubber | 20.0 |
| Mineral rubber | 9.5 |
| Anti-oxidant | 0.5 |
| Graphite | 70.0 |

(2)
| | Parts |
|---|---|
| Rubber | 20.0 |
| Mineral rubber | 9.5 |
| Anti-oxidant | 0.5 |

| | Parts |
|---|---|
| Carbon black | 5 to 90 |
| Graphite | 5 to 90 |
| Metallic powders such as zinc, lead, aluminum, etc. | 5 to 90 |

The pipe 1 as above mentioned is of sufficiently large internal diameter relative to the space to be occupied by the cable conductors and their insulation to permit the conductors readily to be drawn into the pipe and to permit of their free movement relatively to each other therein.

In order to protect the conductor insulation and the shielding material, if shielding is used, during the drawing in of the conductors I may apply a protective wrapping 7 around the exterior of each insulated conductor as shown in the drawing. This covering which is purely for mechanical protection and takes no part in the operation of the cable may be a rubber frictioned fabric tape, a fibrous braid or other suitable material.

The space within the pipe 1 unoccupied by the cable conductors and their insulation is filled with the inert gaseous medium, that is to say, a gaseous medium which will not detrimentally affect the cable insulation; as an example I might mention a mixture of nitrogen and helium. Such a mixture, furthermore, is of high electrical resistance and has high heat conducting characteristics. A gaseous medium having high heat conducting characteristics is highly desirable for my purpose, for conducting the heat generated by operation of the cable to the metal pipe 1 from which it is radiated. This gaseous medium is maintained under superatmospheric pressure, a suitable pressure being around 200 pounds to the square inch. I have not attempted to show any apparatus for maintaining this pressure as obviously the same may be varied within wide limits.

It will be apparent, I believe, that a cable system such as described above will be relatively inexpensive both as to installation and maintenance.

In the detailed description of my invention I refer to the system as a three phase system. It is to be understood, of course, that this is merely by way of illustration and the invention is not limited by any means to the use of any specific number of conductors.

I wish it to be understood, furthermore, that the expressions "electric cable" or "electric cable systems" are to be interpreted as covering not only cable systems for all methods of transferring electric power between two points, such as, for example, the transmission of power over long distances at high voltages between generating stations and/or sub-stations and/or distribution points, but generator leads as well, in stations, transformer leads, bus leads and connections from within to the outside equipment of stations.

It is to be understood also, as explained above, that the cables may vary greatly in construction, that is to say, the insulation employed, for example, may be different from the materials specifically mentioned, so long as it is a material which is impervious to the gaseous medium with which the pipe 1 is filled, its load carrying capacity is improved by maintaining the gaseous medium under superatmospheric pressure and it may be operated at a higher voltage than is possible at atmospheric pressure.

What I claim is:

An electric cable system comprising in combination a conventional rubber insulated cable conductor, a metal pipe of substantially greater cross section than the conductor loosely enclosing the insulated conductor and a mixture of nitrogen and helium in direct contact with the conductor insulation filling the space in said pipe unoccupied by the insulated conductor.

ROBERT J. WISEMAN.